United States Patent [19]

Date et al.

[11] 4,215,925
[45] Aug. 5, 1980

[54] PHOTOGRAPHIC CURTAIN-TYPE SHUTTER WITH ELECTROMAGNETIC ACTUATION CONTROL

[75] Inventors: Nobuaki Date; Hiroshi Aizawa; Teiji Hashimoto, all of Kawasaki, Japan

[73] Assignee: Canon Kabushiki Kaisha, Tokyo, Japan

[21] Appl. No.: 890,944

[22] Filed: Mar. 28, 1978

[30] Foreign Application Priority Data

Apr. 25, 1977 [JP] Japan ................................. 52/47571

[51] Int. Cl.$^2$ .............................................. G03B 9/34
[52] U.S. Cl. .................................... 354/234; 354/244
[58] Field of Search ............................... 354/241–244, 354/234, 235, 266, 267, 205, 268

[56] References Cited

U.S. PATENT DOCUMENTS 4,109,265  8/1978  Hashimoto ........................... 354/244

Primary Examiner—John Gonzales
Attorney, Agent, or Firm—Toren, McGeady and Stanger

[57] ABSTRACT

A focal plane shutter adapted for use in a single lens reflex camera and having front and rear curtains with respective charge control gears to be operated in engagement with each other during the winding process. At the terminal end of one cycle of winding operation, these gears are released from positive connection with a film winding mechanism, while the front and rear curtains are held in their cocked positions by separate latches in at least a time interval between a moment at which the diaphragm starts to move and a moment at which the mirror flips out of way to actuate release of the front curtain, thereby an electromagnetic release control for the rear curtain latch is prevented from being disturbed as by a shock which would be otherwise exerted on the rear curtain latch at the start of movement of the front curtain.

4 Claims, 2 Drawing Figures

PHOTOGRAPHIC CURTAIN-TYPE SHUTTER WITH ELECTROMAGNETIC ACTUATION CONTROL

BACKGROUND OF THE INVENTION

1. Field of the Invention

This invention relates to photographic cameras, and more particularly to focal plane shutters of the two-curtain type. Still more particularly, it relates to improvements in accuracy and reliability of electromagnetic shutter release actuation control.

2. Description of the Prior Art

The conventional focal plane shutters of the two-curtain type are generally provided with separate latches of which, though one for the opening or front curtain is rendered effective to hold that curtain in cocked position after one cycle of film winding operation is terminated, the other latch for the closing or rear curtain is used to become effective soon after the start of movement of the front curtain, as the rear curtain has so far been retained by a reset bar. During the winding process, this reset bar serves to transmit driving torque from the front curtain wind-up drum to the rear curtain wind-up drum, regardless of whether these drums are mounted in coaxial relation as, for example, disclosed in U.S. Pat. No. 3,633,480, or in off set relation but with their drive gears being coaxial to each other, as, for example, disclosed in U.S. Pat. No. 2,961,934. In any case, this reset bar takes the form of a pin extending from the front curtain cocking drive gear into the path of movement of a projection on the rear curtain cocking drive gear.

Such a reset mechanism for the shutter, though having several advantages such as simple structure and easy operation of "B" exposure, gives rise to a problem of diminishing the accuracy and reliability of high speed exposure control when an operating member for the rear curtain is constructed in the form of an electromagnet. As the attractive force established between the core of the electromagnet and the armature on the rear curtain latch is adjusted to slightly exceed the separating force exerted on the latch by the biasing action of spring means, when the reset bar is moved away from the rear curtain wind-up drum to permit shocking abutment of the latter against the latch therefor, the accuracy and reliability of actuation control of the rear curtain tend to be diminished to a large extent particularly in taking an exposure with as a high shutter speed as 1/2000 sec.

SUMMARY OF THE INVENTION

It is an object of the invention to provide a focal plane shutter of the two-curtain type with a cocking and release apparatus rendering it possible to hold the front and rear curtains by respective latches at a time either soon after one cycle of film winding shutter cocking operation is completed, or just before the start of running down movement of the front curtain, thereby the shock of the abutting engagement of the rear curtain wind-up drum against the latch is prevented from affecting the accuracy and reliability of actuation control of the rear curtain.

It is known to construct the operating means for the rear curtain in the form of an electromagnet with a permanent magnet upon energization of the solenoid to cancel the magnetic flux of the permanent magnet so that an armature is allowed to move away from the core of the electromagnet to effect an actuation of release of the rear curtain from the latch. This type of operating means for the rear curtain, though being advantageous to save consumption of electrical energy when use in making longtime exposures makes it impossible to close the shutter when the actual voltage of an electrical power source or battery falls below a satisfactory operating level, or when a shutter control circuit is damaged to become incapable of producing an actuating signal for the electromagnet. Accordingly, it is required to provide a manual release for the rear curtain, or otherwise, the exposed film will be fogged as it is transported past the opened exposure aperture from the takeup to the supply spool during the rewinding process.

With the reset mechanism described above, however, when the manually operable release means for the rear curtain is unintentionally operated to disengage the latch from the rear curtain wind-up drum in the cocked position, the latter admits of a slight movement until a projection or pin of the cocking drive gear engaging with the rear curtain wind-up drum abuts against the reset bar of the cocking gear engaging with the front curtain wind-up drum, whereby the latch for the rear curtain is no longer effective to hold the rear curtain even after the release means is returned to the initial position. Under this condition, it is unavoidable that at the time of a subsequent actuation of the shutter release, the rear curtain immediately follows up the front curtain with production of a blank or wasteful frame exposure.

A concomitant object of the present invention is, therefore, to solve this problem so that so long as the shutter is in the cocked position, the manually operable release means for the rear curtain is maintained ineffective in response to the application of a force exerted thereon unintentionally by the operator's hand or the like, while nevertheless preserving no influence of the shock on the actuation control of the rear curtain release.

According to the invention, two solutions are proposed, one of which is that besides the two latches for the front and rear curtains there is a third latch arranged upon completion of shutter cocking operation to retain the front curtain drive gear in the cocked position where the reset bar is effective to hold the rear curtain in the cocked position through the drive gear therefor, and upon actuation of the diaphragm closing down mechanism to be disengaged from the front curtain drive gear so that the first and second latches are rendered effective to hold the front and rear curtains in the cocked positions just before a release of the front curtain from the first latch is actuated as by the mirror drive member.

The provision of this third latch gives rise to additional advantages of making it possible to perform mechanical control of "B" exposure and of reducing the required magnitudes of biasing force on the first and second latches to facilitate increase in the accuracy of exposure control. As the transmission of releasing motion from the diaphragm closing down mechanism to the shutter takes a time interval of about a few tens of milliseconds, the shock of the abutting engagement of the front and rear shutter curtain wind-up drums against the first and second latches at the time of operation of the third latch is damped to a negligible level before the shutter is actuated to open, as compared with the prior art.

According to another proposal of the invention, the manually operable release means for the rear curtain is provided with a locking means arranged adjacent the first latch upon completion of shutter cocking operation to become effective to lock the release means and after the actuation of the front curtain release to become ineffective so that the release means can release the rear curtain from latching connection in response to the application of a force on the release means. It is of course possible to arrange the locking means in cooperation not with the first latch but with the master gear for the front curtain, or a braking member.

These and other objects, features and advantages of the invention will become more aparent from the following detailed description taken in conjuction with the accompanying drawings in which:

DESCRIPTION OF THE PREFERRED EMBODIMENTS

Figure 1:
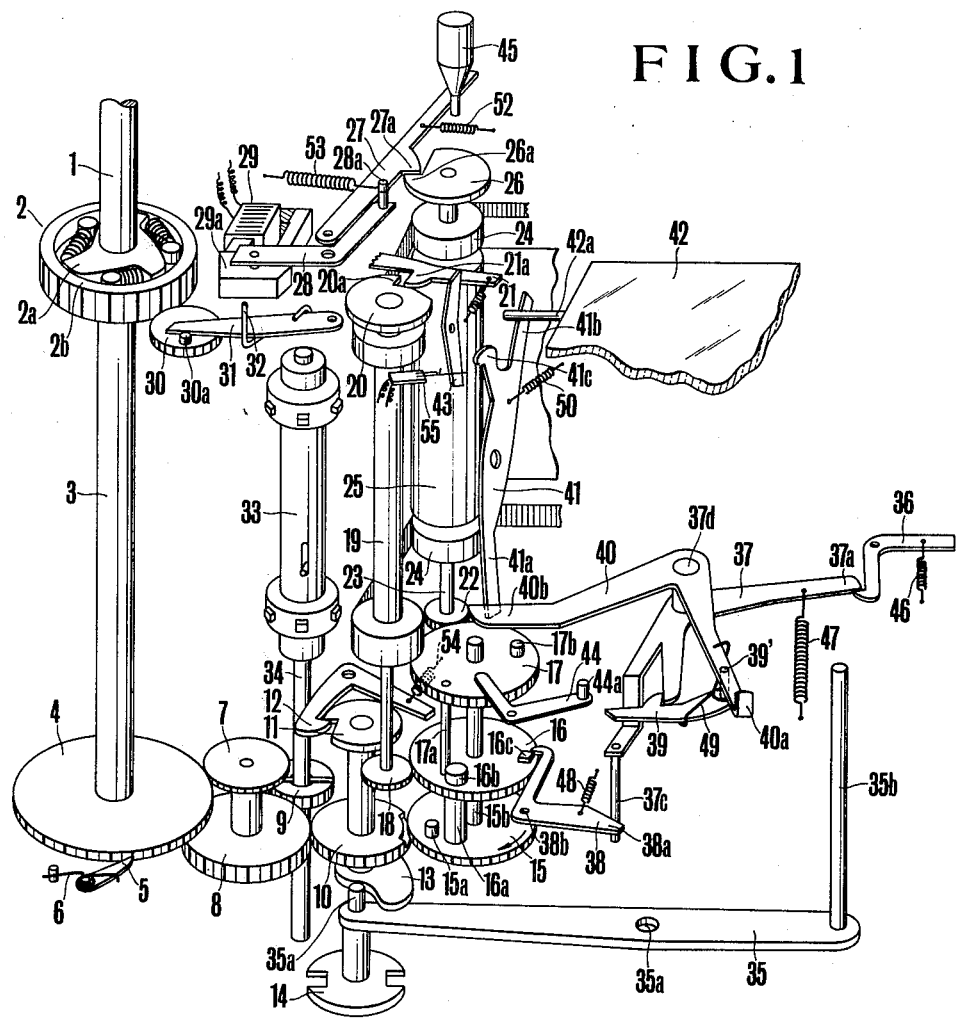
FIG. 1 is a perspective view of one embodiment of a cocking and release apparatus for a focal plane shutter according to the present invention adapted for use in a single lens reflex camera showing part of the shutter, film winding mechanism, mirror drive mechanism and diaphragm closing down mechanism of the camera.

Referring to FIG. 1, one embodiment of a cocking and release apparatus for a focal plane shutter of the two-curtain type according to the present invention adapted to be used in a single lens reflex camera is shown in cocked position. The focal plane shutter has front and rear curtains each one with a wind-up and a wind-off drum, only the former being shown, so that one pair of drums are positioned at each one end of the picture area. In order to set the shutter, the front and rear curtains are wound on the wind-up drums, thus tensioning drive springs which are placed in the respective wind-up drums, when a film winding mechanism is operated.

The film winding mechanism for advancing a film not shown each frame in one cycle of operation of a winding-up lever not shown includes a driving shaft 1 having the winding-up lever fixedly secured at the top end thereof and a pawl hub 2a fixedly secured at the bottom end thereof, a driven shaft 3 fixedly carrying a sleeve 2b at the top end thereof, the sleeve 2b constituting a one-way clutch 2 together with the pawl hub 2a and spring-constrained rollers, a gears 4 fixedly connected to the bottom end of the driven shaft 3 and cooperative with a reverse rotation preventing pawl lever 5 under the action of a hair-pin spring 6, an intermediate gear 7 meshing with the gear 4, a driving gear 8 fixedly connected to the gear 7 and meshing with a gear 9 which is operatively connected to a shaft 34 for a sprocket 33, and a multiple-purpose gear 10 meshing with the driving gear 8 and fixedly connected to a shaft at a center thereof, the top end of which fixedly carries a cam disk 11 having a cam notch arranged upon engagement with a pawl lever 12 to stop movement of the film winding mechanism, the opposite end being connected to a recessed disk 14 for coupling with a motor drive unit not shown.

The cocking and release apparatus includes a master gear 15 positioned in the same plane as that of the upper half periphery of the gear 10 to be driven by the latter during the winding process and upon completion of one cycle of winding operation to be released from operative connection with the gear 10 to return to an initial position illustrated, as a cutout formed in a portion of the gear 10 is brought into alignment with the master gear 15 at that time. During this winding process, clockwise movement of the master gear 15 is transmitted through a pin 15a-and-a pin 16a connection to a first drive transmission gear 16, the latter meshing with a pinion 18 fixedly connected to a shaft 19 for the front curtain wind-up drum at one end thereof, the opposite end of which has a cam disk 20 fixedly secured thereto, and therefrom transmitted through a pin 16b-and-a pin 17a connection to a second drive transmission gear 17, the latter meshing with a pinion 22 fixedly connected to a shaft 23 for the rear curtain wind-up drum 25 at one end thereof, the opposite end of which has a second cam disk 26 fixedly secured thereto. Freely rotated about the shaft 23 are a pair of idlers 24 around which are looped respective belts attached to the front curtain at one ends thereof, the opposite ends of which are attached to the drum on the shaft 19. The first and second cam disks 20 and 26 have cam notches 20a and 26a arranged to cooperate with first and second latching levers 21 and 27 respectively.

According to one feature of the invention, when the cocking operation has reached the terminal end of movement of the first and second cam disks 20 and 26, the first and second cam notches 20a and 26a are moved away from the respective lever pawls 21a and 27a to create gaps of different length, the former being longer than the latter, and then stopped in these positions, as a third latching lever 38 is brought into latching engagement with a projection 16c on the first drive transmission gear 16 under the action of a spring 48. According to another feature of the invention, this third latching lever 38 is arranged to be actuated at a point in time near the start of movement of a diaphragm closing down mechanism, so that just before an actuating lever 43 for the first latching lever 21 is struck at its tail by an arm 41c of a mirror drive lever 41, abutting engagement of the second cam notch 26a against the second latching lever pawl 27a is established and is followed, after a certain time, by that of the first cam notch 20a against the first latching lever pawl 21a. Thus, the pin 16b which has served as a reset bar member is slightly moved away from the pin 17a, permitting the front and rear curtains to be latched independently of each other.

In the latter connection, it should be explained that when a shutter button not shown is depressed to turn a release lever 36 in a counter-clockwise direction against the force of a spring 46, the release lever 36 is disengaged from a drive lever 37. As the drive lever 37 is turned about a shaft 37d in a clockwise direction under the action of a drive spring 47, a downwardly extending pin 37c is acted on a tapered portion 38a of the third latching lever 38, causing the latter to be disengaged from the projection 16c. As a result, the first and second latching levers 21 and 27 are rendered effective to hold the front and rear curtains in the cocked positions independently of each other. Such driving motion of the lever 37 is transmitted through a diaphragm return control lever 39 to a two-armed lever 40 and therefrom both to the diaphragm closing down mechanism through one arm 40a and to the mirror drive lever 41 through the other arm 40b. After the diaphragm is adjusted to the setting and a mirror 42 is flipped out of the way by an arm 41b bearing a rod of a mirror support frame not shown, the actuating lever 43 is turned in a clockwise direction to disengage the first latching lever pawl 21a from the cam notch 20a against the force of a spring 51 and at the same time to open a switch 55 which is connected across a timing capacitor not shown.

At the termination of duration of a preset shutter time, the solenoid of an electromagnet 29 is energized to produce a magnetic flux which cancels that of an associated permanent magnet, causing an armature 29a to be moved away from the body of electromagnet 29, as a lever 28 carrying the armature 29a at the end of one arm thereof is biased by a spring 53 in a counter-clockwise direction. Such counter-clockwise movement of the lever 28 is transmitted through an upwardly extending pin 28a to disengage the second latching lever 27 from the second cam disk 26, thereby the rear curtain is driven to run down to the exposure aperture closed position. Because of the independent latching of the front and rear curtains after the actuation of the third latching lever 38, even when the shutter time is shortened to as fast a level as 1/2000 sec., it is possible to achieve an increase in the accuracy and reliability of exposure control which would not be otherwise effected by the shock of abutting of the second cam disk 26 against the second latching lever pawl 27a soon after the front curtain is released.

When the rear curtain nears the terminal end of running down movement, a lever 44 is struck at its tail by a pin 17b upwardly extending from the second drive transmission gear 17, and then turned in a clockwise direction to disengage the lever 39 from the drive lever 37 against the force of a hair-pin spring 49, thereby the diaphragm is returned to an aperture fully open position, and at the same time, the mirror 42 is moved from the non-viewing to the viewing position. On the other hand, the pin 17a serves to disengage the lever 12 from the cam disk 11, thereby it being made possible to perform the next cycle of film winding and shutter cocking operation.

In order to set the camera, the cocking lever may be operated, while permitting a set gear 30 to turn one revolution in engagement with the peripheral teeth of the clutch sleeve 2b, with a pin 30a bringing the armature 29a into contact with the body of electromagnet 29 through a lever 31 and an upwardly standing end of a bias spring 32 during the first half of that revolution. In the second half revolution of the gear 30, the lever 31 is turned in a counter-clockwise direction, while the armature 29a is retained in the attracted position by the permanent magnet. As the shaft of the gear 10 is turned, a cam disk 13 causes a charge lever 35 to be turned about a pivot axis 35a in a counter-clockwise direction. Such movement of the lever 35 causes counter-clockwise movement of the drive lever 37 through an upwardly extending pin 35b, until the arm 37a is latched by the release lever 36 and the lever 39 is engaged with the lever 37.

If it happens that a malfunction of the automatic actuating means including the electromagnet 29 occurs after the shutter is opened, the operator may depress a button 45 so that the second latching lever 27 can be disengaged from the second cam disk 26, while still permitting the armature 29a to remain stationary in the attracted position by the permanent magnet, thereby the shutter is closed. After the shutter is reset in the cocked position, however, the manually operated release control button 45 is no longer effective to actuate the rear curtain, since the lever 27 operates in such a manner that when the button is unintentionally depressed, the pawl 27a is taken out of alignment with the cam notch 26a, but when the force exerted to depress the button 45 is removed from the latter, the lever 27 returns under the action of the spring 52 to the initial position where it is effective to hold the rear curtain after the front curtain runs down, because of the provision of the third latching lever 38 for creating the gap between the cam notch 26a and the pawl 27a. This constitutes an additional feature of the present invention.

Figure 2:
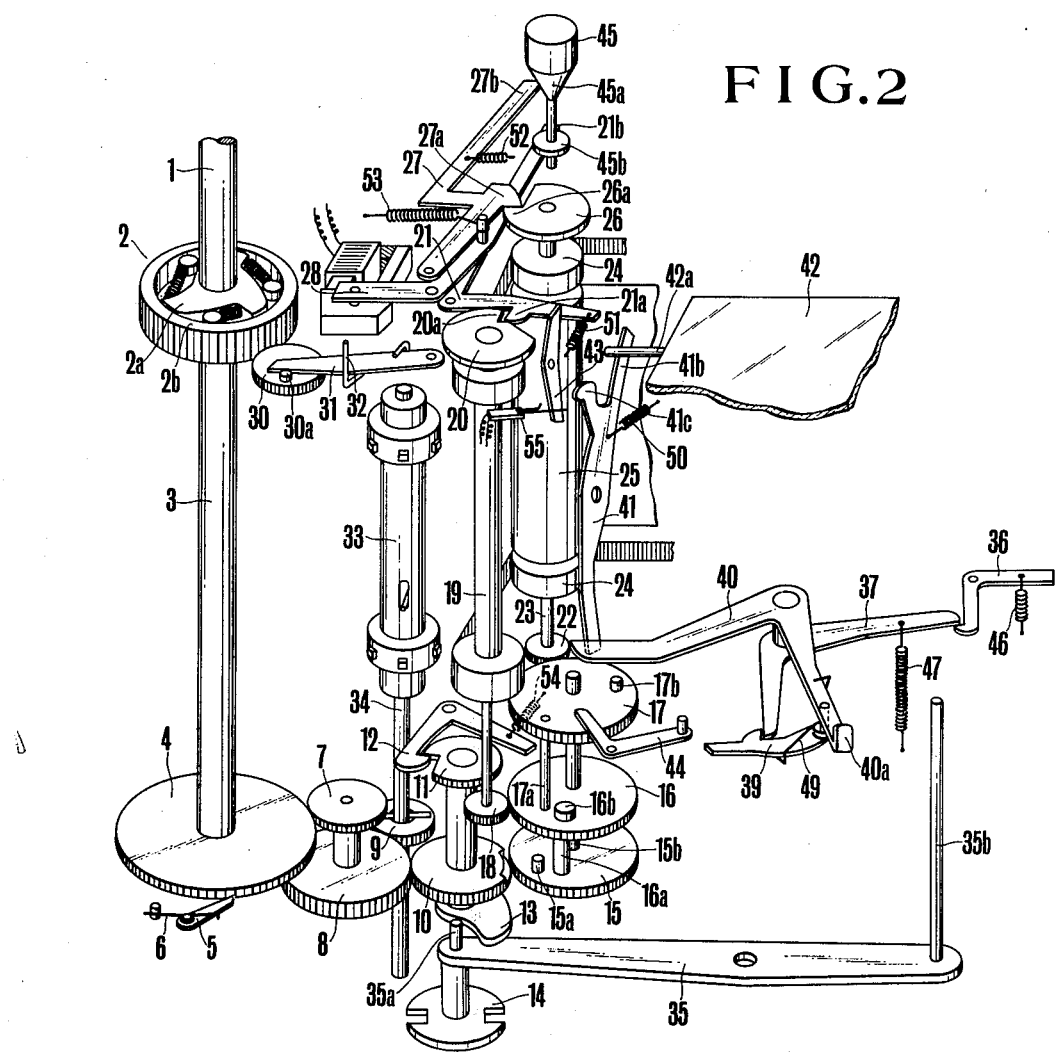
FIG. 2 is a similar view showing another embodiment of the invention.

FIG. 2 shows another embodiment of the invention which is different from the above-mentioned embodiment in that, instead of using the third latching lever, there is provided a locking mechanism for the manually operable release control button 45. The locking mechanism comprises a disk 45b fixedly mounted on a downwardly pinnacled portion of the button 45 and a detent member in the form of an arm 21b extending from the first latching lever 21 into the path of movement of the disk 45b when the first latching lever 21 is effective to hold the front curtain.

In operating the camera of FIG. 2, when the winding lever is cocked, the shutter is reset by a cocking mechanism of similar construction to that described in connection with the first embodiment. When the cocking mechanism nears the terminal end of movement, the first latching lever 21 is first turned in the clockwise direction as the pawl 21a drops into the cam notch 20a, while the arm 21b creeps into a space under the disk 45b, provided that the button 45 is not depressed. A further slight movement of the cocking mechanism causes establishment of the second latching connection between the lever 27 and the cam disk 26, with the arm 27b being brought into abutting engagement with the tapered portion 45a of the button 45. At the completion of one cycle of shutter cocking operation, the master gear 15 is released from driving connection at the pin 15a with the pin 16a on the first drive transmission gear 16. Because of the lack of the third latching lever, the first drive transmission gear 16 is turned backward under the action of the drive spring in the front curtain wind-up drum until the first cam notch 20a abuts against the pawl 21a. During this process, the second cam disk 26 is maintained almost stationary, so that the reset bar member or pin 16a is slightly moved away from the pin 17b as shown in FIG. 2 in a manner similar to that described in connection with the first embodiment as occurring at a time just after the third latching lever 38 is actuated. Therefore, when the shutter button is depressed to release the front curtain, any shock is given to the control of release actuation of the rear curtain.

After the front curtain runs down, the button 45 may be depressed to release the rear curtain from the latched position. In this case, the tapered portion 45a is acted on the lever arm 27b to disengage the pawl 27a from the cam notch 26a. So long as the front curtain is held in the cocked position by the lever 21, it is impossible to actuate the second latching lever 27, because the downward movement of the button 45 is prevented by the detent member or arm 21b bearing the disk 45b.

What is claimed is:
1. A camera provided with an electrically controllable focal plane shutter, said camera comprising:
 (a) a shutter control circuit including an electromagnet;
 (b) a film winding mechanism;
 (c) a front shutter curtain;
 (d) a rear shutter curtain;

(e) a front curtain winding-up member engaging said front curtain and rotatable in connection with said film winding mechanism;

(f) a rear curtain winding-up member engaging said rear curtain coaxially rotatable with but independently from said front curtain winding-up member, said rear curtain winding-up member being moved by said front curtain winding-up member to wind-up said rear shutter curtain;

(g) front curtain latching means for latching said front curtain in a running down ready position after the completion of shutter winding-up and for releasing said front curtain in response to release means; and (h) rear curtain latching means for latching said rear curtain in a running down ready position after the completion of shutter winding-up and responsive to the action of said electromagnet resulting from the production of an output from said shutter control circuit for releasing said rear curtain;

said front curtain winding-up member and said rear curtain winding-up member being taken out of engagement with each other when said front and rear curtains are latched, respectively, by said front and rear curtain latching means.

2. A camera provided with an electrically controllable focal plane shutter, said camera having:

(a) a shutter control circuit including an electromagnet;

(b) a film winding mechanism;

(c) a front shutter curtain;

(d) a rear shutter curtain;

(e) front curtain winding-up means rotatable in connection with said film winding mechanism;

(f) rear curtain winding-up means coaxially rotatable with said front curtain winding-up means and connected through engagement with said front curtain winding-up means to said film winding mechanism;

(g) first latching means for latching said front curtain winding-up means in the cocked position and for latching said rear curtain winding-up means in the cocked position through said front curtain winding-up means;

(h) release means for releasing said first latching means;

(i) front curtain latching means for latching said front shutter curtain in the running down ready position after said front curtain winding-up means is released from said first latching means;

(j) rear curtain latching means for latching said rear shutter curtain in the running down ready position after the said front curtain winding-up means is released from said first latching means;

(k) front curtain release means acting on said front curtain latching means in response to said release means for releasing said front curtain from the latched position; and (l) rear curtain release means acting on said rear curtain latching means as controlled by the electromagnet of said shutter control circuit after the release of the front curtain.

3. A camera provided with an electrically controllable focal plane shutter, said camera comprising:

(a) a shutter control circuit including an electromagnet;

(b) a film winding mechanism;

(c) a front shutter curtain;

(d) a rear shutter curtain;

(e) front curtain winding-up means rotatable in connection with said film winding mechanism;

(f) rear curtain winding-up means coaxially rotatable in engagement with said front curtain winding-up means;

(g) front curtain latching means for latching said front curtain in a running down ready position after the completion of shutter winding-up and for releasing said front curtain in response to release means; and (h) rear curtain latching means for latching said rear curtain in a running down ready position after the completion of shutter winding-up and responsive to the action of said electromagnet resulting from the production of an output from said shutter control circuit for releasing said rear curtain;

(i) said electromagnet being provided with a permanent magnet for attracting said rear curtain latching means in the latched position and with a coil which upon being supplied electrical power to produce a magnetic flux cancels the attractive force of said permanent magnet, and further including operating means for releasing said rear shutter curtain from the latched position when said electromagnet is supplied with no current.

4. A camera according to claim 3 further including locking means for locking operation of said operating means in response to said front shutter curtain latching means.

* * * * *